United States Patent Office 3,255,797
Patented June 14, 1966

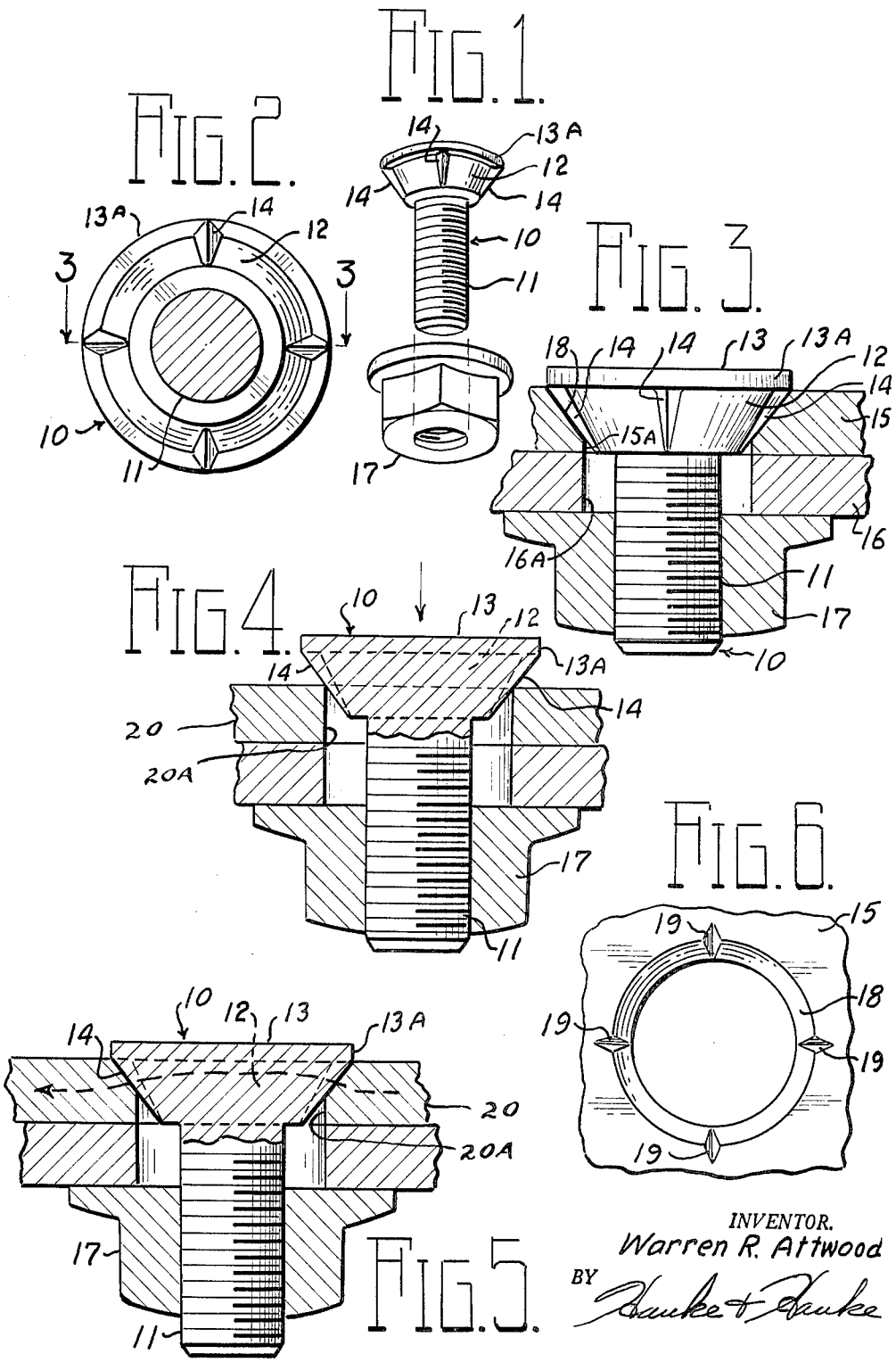

3,255,797
STRUCTURAL ASSEMBLIES
Warren R. Attwood, 4077 2nd St., Wayne, Mich.
Substituted for abandoned application Ser. No. 70,550, Nov. 21, 1960. This application June 15, 1964, Ser. No. 376,297
1 Claim. (Cl. 151—37)

My invention relates to structural assemblies and more particularly to such assemblies including a new self counter sinking flat head bolt adapted for stress transmitting connection to metal structural plates and the like.

In the development of structural systems relating to perforated structural material, where it is necessary to connect structural members with stress carrying bolts, certain problems have arisen which the present invention has solved.

For example, when assembling paneled structures, it may be desirable to panel over bolted frames in which the case the bolt must be nearly flush with the frame. Conventional countersunk bolts, however, do not provide the structural capacities required in structural systems utilizing perforated structural material. Further such conventional bolts require extensive countersinking operations.

The present invention provides a structural assembly comprising a metallic structural member having a perforation and a particularly constructed bolt member. The bolt is provided with teeth and upon tightening a nut the teeth are forced into the structural member to plastically displace the metal to form a stress transmitting connection. The bolt is provided with a conical head and the teeth extend along the surface of the conical head to a point of connection between the ends of the teeth and the outer peripheral edge of a wafer-like head portion. In this way the teeth reinforce the head and therefore a relatively thin head can be provided without weakening the connection. The bolt head being thin provides a low profile on the surface of the joint to present a pleasing appearance and a joint over which panels or the like can be readily installed without the necessity of countersinking or counterboring.

Several prior patents disclose bolts similar in construction to the bolt of the present disclosed assembly. Examples of prior art bolts can be found in U.S. Patent No. 2,933,006 issued to one J. F. Gibb on April 19, 1960, as well as U.S. Patent No. 378,857 issued to W. W. Woodford on February 28, 1888, and U. S. Patent No. 375,177 issued to D. W. McKinnon on December 20, 1887.

The Woodford patent discloses a bolt for use in wood. The bolt is provided with a conical head with extending wings or keys incorporating a disc-like head portion. The wing or keys serve only to grip the wood to prevent rotation. The teeth do not extend to the outer periphery of the head portion and unlike the bolt of the present disclosure the teeth therefore do not tend to strengthen the head so that relatively thin heads can be used without weakening the assembly.

The Gibb patent discloses a bolt in which teeth are provided on a cylindrical shank for preventing rotation of the bolt. Since the upper portion of the shank is not conical, the deformation produced in the structural member of the assembly herein disclosed will not be produced in the assembly disclosed in the Gibb patent. Again, the teeth terminate far short of the outer periphery of the head portion of the bolt and therefore it would be necessary to provide a relatively thick head portion to produce a stress transmitting connection.

The McKinnon patent discloses a bolt and nut which are intended to be positioned in a countersunk and counterbored hole. The nut is provided with teeth and the bolt is intended to be rotated by a screwdriver or similar tool to provide a flush surfaced connection. There is no teaching in this patent of providing teeth on a conical shaped head portion of the bolt to produce a stress transmitting connection having the head portion of the bolt substantially flush with the surface of the structural member and without necessitating the operations of countersinking or counterboring.

An object of the present invention is to improve structural assemblies by providing a new conical-headed bolt adapted to substantially fill the hole in the member to which it is secured for transmitting compression stresses which could otherwise cause buckling.

Another object of the invention is to simplify the assembly of structural members by providing a bolt head with teeth sharp enough and at a sufficient angle to allow finger pressure to prevent rotation on turning of the nut.

A further object of the invention is to improve the appearance of bolted structures by using a new flat-headed bolt which nevertheless has the stress-carrying abilities required in such structures.

Still another object of the invention is to facilitate the assembly of panels on bolted structures by providing a new flat headed structural bolt over which paneling may be directly installed.

Yet a further object of the invention is to simplify bolting of structural members by providing a new conical-headed bolt adapted to be self-countersinking.

For a more complete understanding of the invention, reference may be had to the accompanying drawing illustrating preferred embodiments of the invention in which like reference characters refer to like parts throughout the several views and in which FIG. 1 is a perspective view of a nut and a bolt utilized in the structural assembly of the present invention.

FIG. 2 is a cross-sectional view of the bolt shown in FIG. 1 looking at the underside of the head.

FIG. 3 is a cross-sectional view of structural assembly of the present invention.

FIG. 4 is a cross-sectional view of a structural assembly about to be secured.

FIG. 5 is a cross-sectional view of the structural assembly of FIG. 4 with the bolt secured.

FIG. 6 is a fragmentary view showing the edges of a perforation after the present bolt has been used.

*Description*

The structural assembly of the present invention as can best be seen in FIGS. 3–5 preferably comprises a pair of perforated structural members 15–16 clamped one to the other by a bolt 10 and a nut 17.

The bolt 10 as illustrated, comprises a threaded shank 11 having a conical head 12 provided with a flat top 13 extending radially beyond the larger end of the head to provide an annular flange 13A.

A plurality of angularly spaced elongated teeth 14 are provided on the conical surface of the head 12; these teeth merge with the smaller end of the conical surfaces and are sloped outwardly from the shank at a greater angle than is the conical surface. The larger ends of the teeth 14 adjoin the flange 13A.

When used to clamp two structural members 15 and 16 together as in FIG. 3, the bolt 10 is passed through perforations 15A and 16A and the nut 17 is tightened. The teeth 14 are at a sharp enough angle with respect to the axis of the hole 15A to permit finger pressure to hold the bolt head 13 as the nut is turned. The teeth 14 are constructed of a material harder than that of the structural members 15–16 so that upon tightening the nut 17, the teeth 14 cut into the edge of the hole, and since the teeth 14 and the head 12 enlarge in cross section from the inner to the outer ends, a spreading or displacement of the metal of the member 15 occurs which permits the conical surface to be compressed into the member 15 as at 18 (FIGS. 3 and 6), thereby providing its own countersinking. The teeth, being quite sharp and hard, leave impressions 19 as seen in FIG. 6 which effectively prevent any rotation of the bolt thereafter.

The bolt sinks in until the upper surface of the member 15 engages the under side of the flange 13A as shown in FIG. 3. Sufficient bearing area on the flange 13A remains intermediate the teeth 14 to permit additional clamping pressure to be applied.

In FIG. 3 it will be seen that when fully embedded into the plate 15, the solid conical bolt head replaces substantially all of the metal which has been removed from the plate 15 to make the perforation 15A and the metal which is compressed and which will be displaced both downwardly and upwardly to some extent is replaced by the teeth 14. Thus compression stresses may be transmitted directly across the perforations 15A through the bolt head 12.

This result is achieved to a satisfactory extent even if the perforation, such as 20A in member 20 of FIGS. 4 and 5, is considerably larger, the dash line arrow in FIG. 5 illustrating the stress path in this case.

FIG. 4, it is noted, illustrates the position of the bolt 10 prior to tightening of the nut 17.

When installed, it is seen that the low flat head 13 is provided on the bolt 10 makes possible paneling directly over the head substantially as is done with conventional countersunk screws and bolts.

It is apparent that the conical head 12 of the bolt 10 serves to center the bolt 10 perfectly in the perforation 15A and seal the assembly from corrosion. The conical head 12 and the teeth 14 extending to the outer peripheral edge of the top 13 serve to strengthen the head of the bolt and permit the provision of a relatively thin wafer-like top 13 over which panels or the like can be installed without requiring counterboring or countersinking and without weakening the structural assembly. The teeth 14 not only serve to prevent rotation but also help to resist shearing stresses which would otherwise tend to shear off the thin top 13.

It has been preferred to provide at least four teeth 14 equally spaced about the head portion 12 because it has been found that when less than this number are provided, it is difficult to prevent the bolt from turning with only thumb pressure upon initial rotation of the nut. The four teeth 14 also insure more perfect alignment with the perforation and serve to provide more uniform strength to the thin top 13.

Although I have described only one embodiment of my invention, it will be apparent to one skilled in the art to which the invention pertains that various changes and modifications may be made therein without departing from the spirit of the invention or the scope of the appended claim.

I claim:

In combination with a metallic load carrying structural member having a perforation, a bolt comprising (a) a threaded shank portion extending through said perforation and adapted to receive a nut at one end thereof,
(b) the opposite end of said shank portion being provided with a frusto-conical portion aligned axially with and sloped outwardly from said shank portion, said frusto-conical portion being of an axial length substantially equal to the width of said structural member,
(c) the free end of said frusto-conical portion being the larger end and having a radius greater than the radius of said perforation and a relatively thin head portion being provided on the free end of said frusto-conical portion and having an annular outer peripheral edge formed on a radius larger than the radius of the free end of said frusto-conical portion and a planar top surface and a parallel under surface,
(d) the smaller end of said frusto-conical portion having a greater radius than the radius of said shank portion to form an annular shoulder at the junction of said frusto-conical portion and said shank portion,
(e) at least four equally annularly spaced teeth having spaces therebetween which are greater than the circumferential width of the teeth and each extending radially from the surface of said frusto-conical portion and extending lengthwise thereof with the inner ends of said teeth merging with said smaller end of said frusto-conical portion and being connected to said under surface and extending to said annular outer edge of said head portion,
(f) said teeth being triangular in cross section and increasing in cross sectional area from the inner to the outer end thereof with the apex of the triangle being the radially outermost part of the tooth and being symmetrical about said apex, and
(g) said teeth being sloped outwardly from said shank portion at an angle greater than the slope angle of the surface of said frusto-conical portion and being of a material harder than the material of said structural member whereby upon tightening of the nut on said shank portion said teeth will be forced into said structural member and displace the material therein to provide a stress transmitting connection therebetween.

References Cited by the Examiner

UNITED STATES PATENTS

| | | | |
|---|---|---|---|
| 1,855,447 | 4/1932 | Hagstedt | 151—37 |
| 1,894,708 | 1/1933 | Sardeson | 151—37 |
| 2,933,006 | 4/1960 | Gibb | 85—9 |

FOREIGN PATENTS

| | | |
|---|---|---|
| 500,583 | 3/1954 | Canada. |
| 25,069 | 8/1922 | France. |

EDWARD C. ALLEN, *Primary Examiner.*